(12) United States Patent
Alper

(10) Patent No.: US 6,180,010 B1
(45) Date of Patent: *Jan. 30, 2001

(54) REMOVAL OF ORGANIC CONTAMINANTS FROM AN AQUEOUS PHASE USING FILTRATION MEDIA INFUSED WITH AN ABSORBENT COMPOSITION

(75) Inventor: Hal Alper, Flowery Branch, GA (US)

(73) Assignee: Mother Environmental Systems, Inc., Gainesville, GA (US)

( * ) Notice: Under 35 U.S.C. 154(b), the term of this patent shall be extended for 0 days.

This patent is subject to a terminal disclaimer.

(21) Appl. No.: 09/272,445

(22) Filed: Mar. 19, 1999

Related U.S. Application Data

(60) Provisional application No. 60/079,210, filed on Mar. 24, 1998.

(51) Int. Cl.$^7$ .......................... B01D 37/02; B01D 15/00; C02F 1/28
(52) U.S. Cl. .......................... 210/680; 210/777; 210/799; 210/502.1; 210/504; 210/692; 210/282
(58) Field of Search ...................... 210/690, 691, 210/679, 680, 692, 282, 502.1, 506, 508, 509, 799, 504, 505, 507, 500.25, 500.27, 500.29, 500.35

(56) References Cited

U.S. PATENT DOCUMENTS

| | | | |
|---|---|---|---|
| 4,664,812 | 5/1987 | Klein | 210/692 |
| 5,437,793 | 8/1995 | Alper | 210/925 |
| 5,681,476 | 10/1997 | Grund et al. | 210/692 |
| 5,698,139 | 12/1997 | Alper | 210/925 |
| 5,833,862 | * 11/1998 | Holland | 210/692 |
| 5,837,146 | 11/1998 | Alper | 210/925 |
| 5,908,558 | * 6/1999 | Holland | 210/692 |
| 5,961,823 | * 10/1999 | Alper | 210/198.1 |
| 6,027,653 | * 2/2000 | Holland | 210/692 |

OTHER PUBLICATIONS

Vardeman, 1998, Environmental Protection, Dec. 1998; 34, 36,

* cited by examiner

Primary Examiner—Robert J. Popovics
(74) Attorney, Agent, or Firm—Klauber & Jackson

(57) ABSTRACT

A method and apparatus for removing organic contaminants from an aqueous phase in which the contaminant is solubilized. In the method the aqueous phase is passed through a fluid-pervious filtration media which has been infused with an absorbtion composition comprising a homogeneous thermal reaction product of an oil component selected from the group consisting of glycerides, fatty acids, alkenes, and alkynes, and a methacrylate or acrylate polymer component. The contaminant is thereby immobilized at said media, and the purified filtrate having passed through the filtration media is collected as the product.

21 Claims, 5 Drawing Sheets

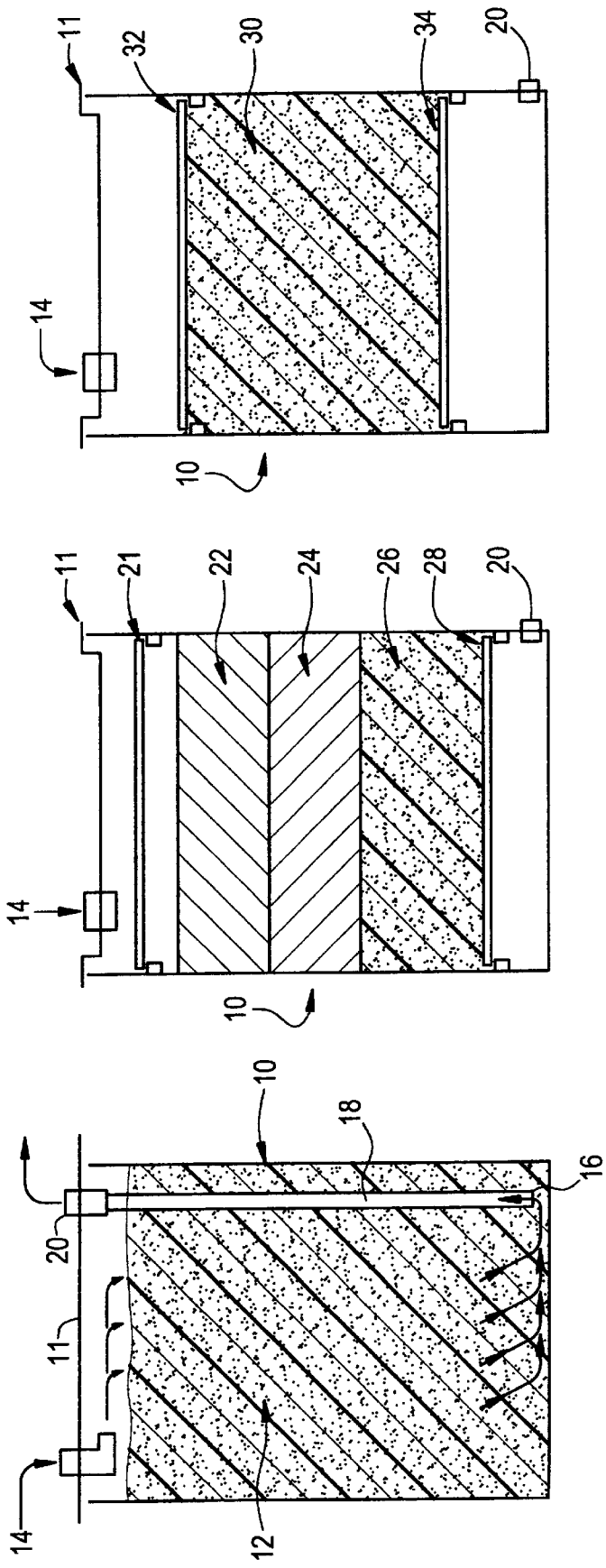

REMOVAL OF ORGANIC CONTAMINANTS FROM AN AQUEOUS PHASE USING FILTRATION MEDIA INFUSED WITH AN ABSORBENT COMPOSITION

This application claims priority from provisional application No. 60/079,210 filed Mar. 24, 1998.

FIELD OF INVENTION

This invention relates generally to apparatus and methods for removing contaminants from aqueous systems, and more specifically relates to filtration devices and methods for removing slightly soluble organic compounds from such aqueous systems.

BACKGROUND OF INVENTION

In recent years many previously clean water sources have been found to be contaminated with pernicious slightly soluble organic compounds such as benzene, toluene, xylene, halogenated hydrocarbons, ethoxylated glycols, etc. These noxious contaminants are among the more difficult compounds to remove from water, and indeed most are carcinogenic. Currently, treatment of such contaminated water sources is effected with activated carbon, optionally along with air stripping, in an effort to reduce the contaminant levels to EPA standards. Frequent reprocessing is necessary as activated carbon has extremely limited affinity for these compounds.

SUMMARY OF INVENTION

Now in accordance with the present invention, it has been found that the compositions disclosed in the present inventor's U.S. Pat. Nos. 5,437,793; 5,698,139; 5,837,146; and 5,961,823 (all of which disclosures are hereby incorporated by reference) have extremely strong affinities for the aforementioned contaminants in water; and that when aqueous streams containing these noxious contaminants are passed through filtration media incorporating these inventive compositions, the contaminants are immobilized at the media, as a result of which concentration levels of the contaminants in the filtrate may be reduced to very low values, in some instances below detectable limits in a single pass. Use of the invention can reduce or eliminate the need for air stripping and multiple passes through activated carbon. Filter configurations incorporating the said compositions (hereinafter referred to as "absorbent compositions") may be based on various water permeable substrates, such as shredded, spun or otherwise configured polypropylene or shredded or spun cellulose, which substrates are infused or otherwise treated with the absorbent compositions, which are then cured. These substrates may then be packed or otherwise disposed in a cartridge or canister filter; or can be formed into cured and infused bag filters which can be emplaced in canisters through which the contaminated water is flowed. Similarly the said absorbent compositions can be incorporated into or upon other filtering substrates and media, such as paper, including compressed pulp materials, particulate porous foamed plastics, mineral particulates such as perlite and vermiculite, and particulate, fibrous or porous ceramic or porous (e.g. sintered) metal substrates and media.

It should be appreciated that the use herein of the term "absorbent composition" is one of convenience for identifying the compositions of my aforementioned patents and patent applications. The specific mechanism by which the noxious contaminants are removed from aqueous streams by conjunctive use of the "absorbent compositions" is not completely understood, and could include attachment and/or fixation of such contaminants by mechanisms which technically involve various physical and/or chemical interactions. The term "absorbent" as used herein is intended to encompass all of these possible mechanisms.

BRIEF DESCRIPTION OF DRAWINGS

The invention is diagrammatically illustrated, by way of example, in the drawings appended hereto, in which:

FIG. 1 is a schematic longitudinal cross-section through a simple filter structure based upon the invention;

FIG. 2 is a schematic view of the type in FIG. 1, except that the filter depicted is based on a plurality of filtration layers of differing compositions;

FIG. 3 is a schematic view of the type in FIG. 1, showing a further arrangement of the filtration layer suitable for practicing the invention;

DESCRIPTION OF PREFERRED EMBODIMENTS

Figure 4:
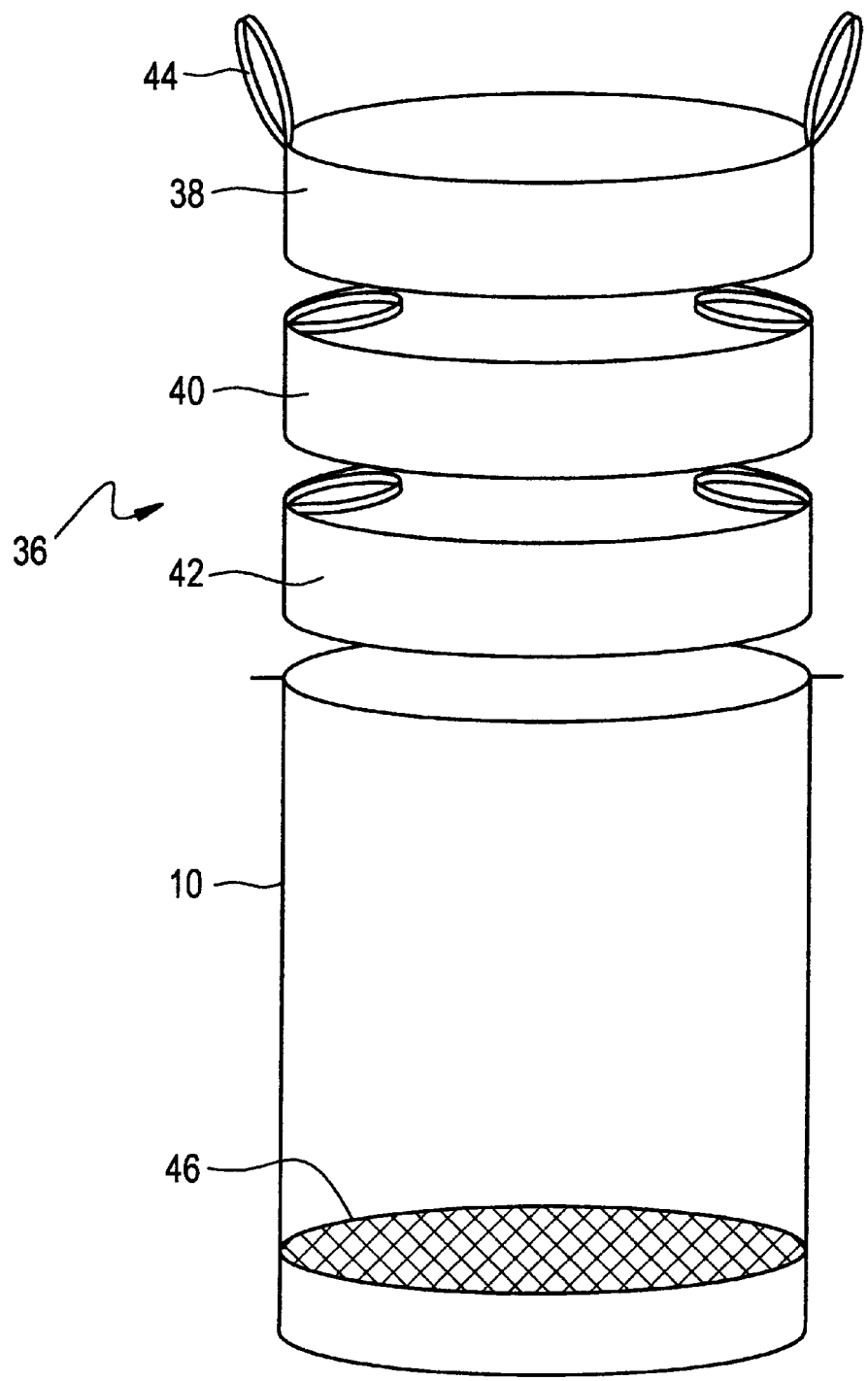
FIG. 4 is a schematic exploded partial view of a further filter arrangement in accordance with the invention, depicting a convenient arrangement for assembly where a series of differing filtration layers is desired.

In FIGS. 1 through 4 herein, schematic cross-sections are shown through representative filter constructions utilizing the principles of the present invention. With the exception of FIG. 4, the constructions are based upon canisters, cartridges, or drums which are internally packed with filtration media comprising substrates such as mentioned above, which have been infused with or otherwise carry absorbent compositions of the types taught in my aforementioned patents and patent applications. Thus in FIG. 1 a 55 gallon drum 10 having a clamped sealed top 11 is packed with an infused substrate which defines the filtration media 12. The substrate here is a shredded cellulose, such as the Absorbent GP material available from Absorbent Corporation of Bellingham, Wash. The shredded material has been treated with an absorbent composition in a manner which will be set forth below. Flow of the aqueous stream to be treated proceeds from the top of the canister via inlet 14, through the volume of filtering media 12, and then out of the canister via the lower opening 16 for the tube 18 having an output port 20. In order to achieve a more uniform distribution of flow through the filtering media 12, a fluid distribution header may adjoin the inlet 14, and a similar output header connected to opening 16 can receive the passed fluid at the bottom of drum 10.

In FIG. 2 an arrangement similar to that of FIG. 1 appears, except that a series of overlying layers 22, 24, and 26 of differing filtration materials is used. The bottommost layer 26 is supported on a mesh screen 28 in turn secured across the interior of the drum. All of the layers may be substrate infused materials in accordance with the invention; or one or more of the layers may comprise conventional filtration media, e.g. activated carbon or the like. Use of the differing layers enables selective or preferential absorption of differing contaminants at the specific filtration sites. Flow enters the drum at 14, and passes through a diffusion screen 21, before proceeding through the filters and exiting at 20.

FIG. 3 shows an arrangement again similar to that of FIGS. 1 and 2, except that the single filtration media 30 used is retained between two transverse screens 32 and 34 mounted transversely across the interior of the canister or drum.

In the exploded schematic view of FIG. 4 a series 36 of cylindrical filter bags is shown. Three such bags 38, 40, and 42 appear—a larger or lesser number can be used depending upon requirements. The filter bags may be of various heights, and may comprise an external porous covering of fabric, porous or perforated plastic or the like, containing internally differing filtration materials. In a typical arrangement where five bags are used, the top such bag 38 may be filled with particulate activated carbon, and the successive underlying bags with shredded polypropylene, pelletized cellulose, ceramic fiber, and metal wool. With the exception of the activated carbon, all of the other filtration materials have been infused with the absorbent compositions used in the invention. Each bag is provided with handles 44 for ease of placement. Typically the bags are placed in a desired arrangement or order in a canister or drum 10 of the type discussed above, where they are supported on one or more mesh screens 46. The bottom of drum 10 is not shown, but the drum top, bottom, and fluid inputs and outputs may be as previously discussed in connection with the showings of FIGS. 1 through 3.

The absorbent composition disclosed in the first of my aforementioned patents, i.e. U.S. Pat. No. 5,437.793, is characterized therein as a coagulant product which comprises a glyceride such as linseed oil reacted with a polymer such as poly(isobutyl methacrylate) which is then diluted with a solvent, such as 2,2,4-trimethyl-1,3-pentanediol monoisobutyrate. The composition formed by the thermal reaction of the linseed oil with the isobutyl methacrylate polymer is a soft resinous product which, when diluted with a solvent, results in a mixture that in the teaching of the said patent can be sprayed onto an oil spill or otherwise introduced to the oil spill to coagulate the oil. Additionally, however, and as disclosed in my further U.S. Pat. No. 5,698,139 patent and copending applications above cited, further experimentation has led to the discovery of additional absorbent compositions produced from polymers and a variety of natural animal and vegetable oils, fatty acids, alkenes and alkynes, which absorbent compositions are all utilizable in the filters and filtration processes of the present invention. More generally these latter compositions are the thermal reaction product of a polymer component with an oil component selected from the group consisting of glycerides, fatty acids, alkenes and alkynes. The reaction conditions can be adjusted to provide a "first endpoint" product or a "second endpoint" product. Preferred compositions are disclosed which comprise the thermal reaction products of methacrylate polymers with a glyceride derived from a variety of natural animal and vegetable oils, or the thermal reaction products of methacrylate polymers with a fatty acid or alkene or alkyne containing from about 8–24 carbon atoms. The combination of a methacrylate polymer component with any of these oil components can provide either a first or second endpoint product, depending upon the reaction conditions. The term "first endpoint product" is used to describe the solubility product of the reaction which is a cooperative structure held together by many reinforcing, noncovalent interactions, including Van Der Waals attractive forces. The term "second endpoint product" is used to describe the product of the reaction which is the result of covalent bond formation between the polymer component and the oil component, as indicated by the change in molecular weight.

The absorbent composition is readily synthesized from a polymer component and an oil component selected from the group consisting of glycerides, fatty acids, alkenes and alkynes. In a preferred embodiment, the product is synthesized from an isobutyl methacrylate polymer, and the oil component is one derived from a natural oil, such as linseed oil or sunflower oil. Optionally, the composition is then diluted with a solvent, such as 2,2,4-trimethyl-1,3-pentanediol monoisobutyrate or acetone. The diluted composition can then be applied to a desired substrate for use as a filtration media pursuant to the present invention.

The polymer component of the absorbent composition is a synthetic polymer such as polymers derived from methacrylates. Preferably, the polymer is derived from methyl methacrylate, ethyl methacrylate, isobutyl methacrylate, or n-butyl methacrylate, or may be a copolymer containing a methacrylate polymer. Most preferably, the polymer is a poly(isobutyl methacrylate) polymer such as that obtainable from ICI Acrylics as ELVACITE® 2045, or a methacrylate/methacrylic acid copolymer such as ELVACITE® 2008 or 2043. However, it is anticipated that other equivalent polymers can be used to prepare equivalent compositions of the invention. Combinations of polymers can be used to advantage in the preparation of the absorbent compositions.

The test used to determine whether or not a polymer can be used in preparing the absorbent compositions of the present invention is to combine the polymer component in question with the oil component, as set forth herein, to see if the resultant combination forms a homogenous product after heating. Ideally, the polymer component percentage of the composition should range from about 15–75%, preferably 20–40%, or more preferably from about 25–35%, by weight.

In one embodiment of the absorbent composition, the oil component of the composition is a glyceride derived from oils of vegetable or animal origin. Vegetable oils are obtained by cold pressing the seeds of a plant to obtain the oil contained therein. Of the vegetable oils, drying oils such as sunflower, tung, linseed, and the like; and semi-drying oils, such as soybean and cottonseed oil, have been shown to be useful as the glyceride component of the invention. Animal oils, such as, for example, fish oil, tallow and lard can also be used as a glyceride component of the composition. It is anticipated that any drying oil or semi-drying oil will work in the composition. Generally, a drying oil is defined as a spreadable liquid that will react with oxygen to form a comparatively dry film. Optionally, combinations of two or more glycerides can be used as reactants with the polymer to provide absorbent compositions useful in the present invention.

In a preferred embodiment, the oil component of the absorbent composition is a glyceride derived from a drying oil, such as linseed oil, that can be obtained from Cargill, Inc. as Supreme Linseed Oil, or sunflower oil. The glyceride should comprise from about 25–85%, preferably about 60–80%, and most preferably, from about 65–75% of the coagulant composition. All percentages in this disclosure are by weight, unless otherwise stated.

Where the oil component of the composition is a fatty acid or alkene or alkyne utilized as the reactant with the polymer, it contains from about 8 to 24 carbon atoms, and preferably from about 10 to 22 carbon atoms. Such fatty acids, alkenes and alkynes are commercially available from many suppliers. Typical fatty acids include both saturated and unsaturated fatty acids, such as lauric acid [dodecanoic acid], linolenic acid, cis-5-dodecanoic acid, oleic acid, erucic acid [cis-docosanoic acid], 10-undecynoic acid, stearic acid, caprylic acid, caproic acid, capric acid [decanoic acid], palmitic acid, docosanoic acid, myristoleic acid [cis-9-tetradecenoic acid], and linoleic acid. Typical alkenes and alkynes contain at least one and preferably one or two degrees of unsaturation, and from about 8 to 24 carbon atoms, with 10–20 carbon atoms being preferred. Preferred alkenes and alkynes are those such as 1-decene, trans-5-decene, trans-7-tetradecene, 1,13-tetradecadiene, 1-tetradecene, 1-decyne, and 5,7-dodecadiyne.

The absorbent composition is a product with characteristics different from either of the starting materials or a simple mixture of the two starting materials, thus showing that a new composition is produced by the thermal reaction. Specifically, the oil/polymer absorbent compositions pass a clear pill test after being heated at the elevated temperatures and do not separate into two parts upon being cooled but, rather form a homogenous, uniphase compound.

More specifically, the solvent can be selected from aliphatic hydrocarbons, aromatic hydrocarbons, alcohols, ketones, ethers, aldehydes, phenols, carboxylic acids, synthetic chemicals and naturally occurring substances.

The absorbent composition used in the present invention is prepared by a thermal reaction process. The first step of the process involves heating the oil component (glyceride or fatty acid or alkene or alkyne) to approximately 235–350° F. at a rate of about 5° F. per minute with continuous stirring. Then, the polymer component, usually in powdered form, is slowly stirred into the heated oil component. Depending upon the particular reactants used, the oil component should range from about 25–85%, preferably about 65–80%, more preferably about 72–77%, and the polymer should range from about 1–50%, preferably about 20–40%, more preferably about 23–28%, of the coagulant composition. After this mixture has been mixed properly, the mixture should be heated to approximately 400–700° F., depending on the particular components utilized for the reaction, and the desired endpoint of the reaction. Typically, reaction temperatures below about 500° F. produce "first endpoint products" while temperatures above about 500° F. produce "second endpoint products"

The mixture should be heated at that temperature until a clear pill test indicates that the reaction has reached its first end point, i.e., a drop of the reaction mixture when placed on a clear glass plate is clear. When a clear pill test indicates that the reaction has reached its first end-point, the mixture should be cooled to a temperature below 200° F., generally about 180° F. After cooling, the coagulant product can be diluted with a suitable solvent to form a more liquid product that is easier to handle and use. The temperature at which the solvent is added is not critical, but the solvent should be added at a temperature where the coagulant composition is still pliable and the solvent will not rapidly evaporate.

Two reactions appear to occur between the oil component and the polymer component based upon the temperature and time. The first endpoint of the reaction results in a rubbery viscoelastic, relatively soft product with a melting point in the range of 100° F. to 250° F. This first endpoint product is homogeneous and does not separate upon melting or dissolution. This reaction occurs at 350° F.–500° F. This is designated the "first endpoint product" (solubility product).

In the second reactions, the polymer undergoes complete or partial chain fission into discrete polymer free radicals at a temperature above about 500° F. At between 350° F. to 500° F., it is believed that partial chain fission of the polymer component (isobutylmethacrylate polymer has a m.w.=300,000 Daltons) occurs at the end of the chain or in the middle. This results in a lower molecular weight product. It is believed that there may also be a solubility reaction occurring (similar to Sn and Pb forming solder) within the ternary composition. The occurrence of a chemical reaction is confirmed, however, due to the change of molecular weight.

Reactions at above 500° F. and up to 900° F. maintained at temperature from 5 minutes to 20 hours, depending on activation energy of compositions, result in the second endpoint product. This reaction is visually observable by color, rheology, and specific heat change in the product [Note: For the first endpoint product the end of the reaction is observed by change in color and a rheology change and the cessation of solution outgassing. There is also a change in specific heat as measured by Differential Scanning Calorimetry]. The second endpoint product has a weight average molecular weight in the range of about 62,000 Daltons which is consistent with complete chain fission of the polymer, resulting in smaller free radicals which results in a lower molecular weight compound. The melting point of these products is usually above 300° F. if the oil component is highly unsaturated, which results in a solid product due to the formation of highly bonded three dimensional densely packed molecular matrix. If the oil component has a low degree of unsaturation, the resultant product is usually liquid, which is consistent with this type of reaction.

The oily component and the polymer component are reacted in a thermal reaction that does not appear to be sensitive to the atmosphere under which the reaction is carried out, i.e., whether it is an inert, oxidizing or reducing atmosphere. Absorbent compositions have been prepared by this reaction which range from soft to hard, and elastomeric to brittle in nature depending upon the ratio of the oil component to the polymer component and the choice of the polymer component and/or the oil component used. If the reaction mixture separates into two phases upon cooling it is not useful for the invention. In this manner, any polymer can be identified for use in the invention.

The mechanism of the thermal reaction remains to be elucidated. While not wishing to be bound by any theory in this regard the reaction appears to be a polymerization or phase transition reaction brought about by heat and which is stable at lower temperatures. It is hypothesized that the elevated temperatures create monomer free radicals of the polymers and copolymers which then crosslink with the unsaturated glyceride molecules. It is also hypothesized that perhaps a phase transition is occurring between the oil component and the polymer component. In an effort to determine what type of interaction or reaction is occurring between the oil component and the polymer component, thermal analysis of several of the absorbent compositions was conducted. The results indicate that a reaction is occurring between the oil component and the polymer.

Differential scanning calorimetry (DSC) was thus performed on several such compositions. DSC is a thermal analysis technique that measure the quantity of energy absorbed or evolved by a sample in calories as its temperature is changed. The sample and a reference material are heated at a programmed rate. At a transition point in the sample's heating, such as when it reaches a melting point, the sample requires more or less energy than the reference to heat. These points are indicated the typical DSC readout.

Samples were taken at the beginning of the reaction procedure described earlier and at the end of the reaction. The DSC profile for the initial starting materials is dramatically different from the profile of the product. The initial profile showed two exothermic events when the DSC analysis is carried out from 40–280° C., one event occurring at about 100° C. and the other at about 217° C. In the DSC profile of the reaction product, however, there was only one exothermic event, occurring at about 261° C. The samples were taken at initial and final points during the reaction and allowed to cool to room temperature before being subjected to the DSC.

In the instance of a further reaction, DSC's of the starting materials and final product were obtained. Again, the DSC curves venerated show that two thermal events occurred for the "just mixed" reactants while only one thermal event occurred for the final product. Thus, the DSCs indicated that the occurrence of a reaction or phase transformation. Similar evidence obtained from IR spectra analysis also confirms that the absorbent compositions used in the invention are distinct products from the reactants used to prepare the absorbent compositions.

EXAMPLE 1

In order to prepare a filter substrate in accordance with the invention, an infusion solution is prepared from a suitable solvent and the absorbent composition. In this example a solution was prepared from 90 w/w 99.9% acetone and 10 w/w absorbent composition which is the reaction product of 31% isobutyl methacrylate, 31% ELVACITE 2045, and 66% linseed oil. The absorbent composition is added to a closed explosion-proof mixer with the acetone and mixed for 12 hours or until the solution becomes homogeneous. The substrate in this Example was a nonwoven polypropylene, viz. the VERASPUN material of Yarorough & Co., Inc. of High Point N.C. This material has a weight of 1 oz./square ft. The substrate material was immersed in the infusion solution until saturated, then removed and excess liquid allowed to drip off. The material was then placed in a convection oven at 110 to 120 deg F. until acetone free. The material was then cured at room temperature for one week. The resulting material was then shredded and subsequently used in filter configurations.

EXAMPLE 2

Filter Test Results

Effectiveness of the treated filter material of Example 1 is illustrated as a selective oil and organic chemical filter. The identity of these samples and the procedure are as follows:

1d—5,000 ppm Gasoline
2d—5,000 ppm Emulsified Diesel Fuel
3d—20,000 ppm Emulsified Light Crude Oil
4d—50,000 ppm (50/50) Toluene/Xylene Procedure: 750 g. of deionized water (20 megaohm) spiked with quantity sufficient dopant to achieve desired initial concentrations was passed through a tube of shredded polypropylene(VERASPUN) material 1 (weight=40 g) at a rate of about 0.5 L/minute with approximate contact time of 1.5 sec. The entire 750 ml was processed through the filter material and collected. A 50 ml sample of each effluent was drawn and analyzed using the standard EPA method for total organic carbon.

Conditions: contact time 1.5 sec. Filter wt=40 gm Effluent wt=750 gm

| Results | Initial Concentration | Final Concentration |
|---|---|---|
| Gasoline | 5,000 ppm | 93.9 ppm |
| Emulsified Diesel | 5,000 ppm | 60.2 ppm |
| Emulsified Light Crude Oil | 20,000 ppm | 74.3 ppm |
| Toluene/Xylene | 50,000 ppm | 91.7 ppm |

As can be seen, even with a massive amount of contamination, the purification factor ranges from 50× to 500× even though the dwell time was short and the weight of water processed exceeded the filter weight by 20×. There was noticeable channeling during this test. The final concentration would have been even lower after one pass without the channeling.

EXAMPLE 3

Seven further samples of contaminated water were subjected to the following test. Using the procedure of Example 1, an AMETEK 5 micron polypropylene sediment filter Model P5 (Ametek, Inc., Sheboygan, Wis. 53082) was infused with the absorbent composition and allowed to cure. This filter was subsequently placed in a polypropylene filter cartridge assembled and attached to a centripetal pump with a flow rate of 3 gal/min. One liter solutions of the following contaminated water samples were prepared.

1) 2% light Crude Oil/$H_2O$
2) 0.5% W/W Gasoline/$H_2O$
3) 2% Light Crude Oil/$H_2O$
4) 100 ppm III Trichloroethane/$H_2O$
5) 0.7% Light Crude Oil/$H_2O$
6) 100 ppm III Trichloroethane/$H_2O$
7) 100 ppm Naptha/$H_2O$ Each entire sample was placed in a 3 liter beaker and allowed to circulate through the pump for one minute. At that time, a 100 ml sample was taken from the outflow hose on the pump. The samples after being passed through the filter were subjected to total organic carbon (TOC) analysis, using the procedure of U.S. EPA "Methods for Chemical Analysis of Water and Wastes, 1979, Revised 1983." Method 415.1.

Results were as follows:

TABLE 1

| Initial Sample | Resulting TOC (mg/L) |
|---|---|
| 1) 2% Light Crude Oil/$H_2O$ | 14.3 |
| 2) 0.5% W/W Gasoline/$H_2O$ | 34.4 |
| 3) 2% Light Crude Oil/$H_2O$ | 38.5 |
| 4) 100 ppm III Trichloroethane/$H_2O$ | 18.2 |
| 5) 0.7% Light Crude Oil/$H_2O$ | 10.9 |
| 6) 100 ppm III Trichloroethane/$H_2O$ | 5.9 |
| 7) 100 ppm Naptha/$H_2O$ | 15.8 | mg/L = Parts Per Million (ppm)

EXAMPLE 4

A 250 ml solution was prepared of 300 parts per billion (PPB) Arochlor 1254 in hexane. This test solution was poured through a funnel containing approximately 3 g of strips of filter material prepared as in Example 1. The absorbent composition of Example 1 constituted 5% by weight of the woven polypropylene material infused with the absorbent. Dwell time of the solution in the funnel was about 1 to 2 seconds. The filtrate having passed through the filter material was analyzed by gas chromatography, from which it was determined that 42% of the PCB 1254 was removed in the single pass.

EXAMPLE 5

A series of tests was run on aqueous input samples to which small concentrations of methyl tertiary butyl ether (MTBF) had been added. Following filtration under various conditions and with several differing substrates, the filtered samples were tested using a GCI-8160 gas chromatograph apparatus of SRI Instruments. A PID detector was used with helium as the carrier gas. The results are shown in Table 2 below. In tests 1 through 7 the filtration media consisted of 12 Ametex 10" spunbound polypropylene filters fit into one Serfilco cartridge unit. The filtering media was infused with 2% by weight of the absorbent composition of the invention, by the procedure described in Example 1. The filtration process was conducted by using a recirculating pumping arrangement for a recirculation period as specified in Table 2. In tests 8 and 9 of Table 2, the filtration media consisted of a non-woven polypropylene filter having average pore size of 5 microns. In test 8 the filter material had been infused with 2% by weight of the thermal reaction product of 10% isobutyl methacrylate and 90%ESSKOL, the latter being a bodied linseed oil product produced by Reichold Chemical. In test 9 the Esskol was replaced by CYKELIN, which is similarly a bodied linseed oil product of Reichold Chemical. The infusion procedure was similar to that described in Example 1 except for the differences in the absorbent composition which have been described. In the testing procedure a gravity pass was used in tests 8 and 9. Specifically a 4" square of the filter material (4 layers of the nonwoven polypropylene) was placed in a tunnel. 40 ml of the contaminated water sample was poured on the material so that it could not flow around it. The effluent from the funnel was collected in a clean sample bottle for analysis. The retention time in the filter was 1 to 2 seconds. It will be evident from the tabularized data of Table 2 that by use of the filtration methods and devices of the invention, vast diminutions of the MTBE concentrations have resulted.

TABLE 2

| | Start With | Filtration Materials | Comments | Results |
|---|---|---|---|---|
| 1) | 333 ppb | Infused Spunbound Polypropylene | 4 min circulation | 140 ppb |
| 2) | 333 ppb | Infused Spunbound Polypropylene | 5 min circulation | 74 ppb |
| 3) | 333 ppb | Infused Spunbound Polypropylene | 10 min circulation | 60 ppb |
| 4) | 333 ppb | Infused Spunbound Polypropylene | 15 min circulation | 52 ppb |
| 5) | 333 ppb | Infused Spunbound Polypropylene | 45 min circulation | 25 ppb |
| 6) | 3.33 ppm | Infused Spunbound Polypropylene | 1 min circulation | 650 ppb |
| 7) | 3.33 ppm | Infused Spunbound Polypropylene | 5 min circulation | 420 ppb |
| 8) | 2 ppm | Infused Nonwoven Polypropylene | gravity | 117 ppb |
| 9) | 2 ppm | Infused Nonwoven Polypropylene | gravity | 189 ppb |

EXAMPLE 6

Figure 5:
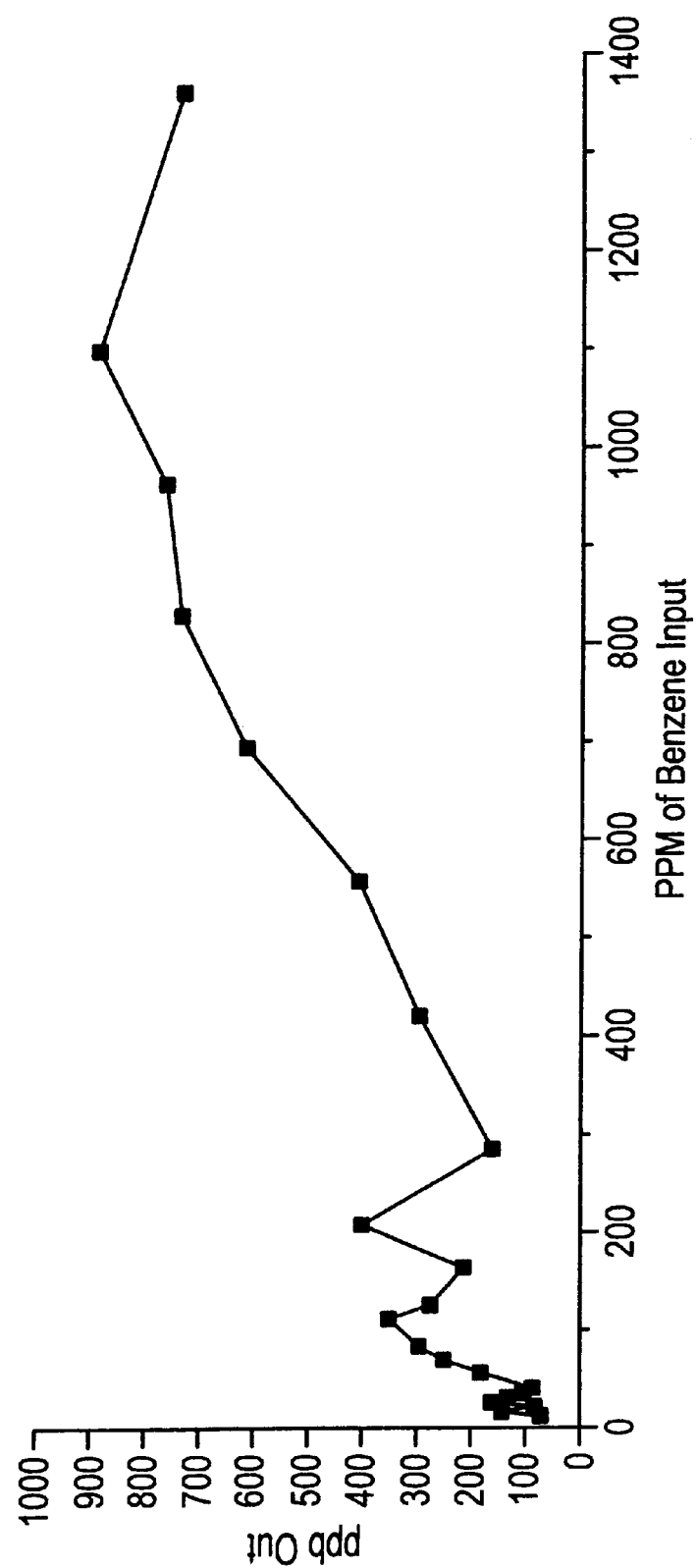
FIG. 5 is a graph illustrating removal of benzene from contaminated water samples, as a function of benzene concentration, when the sample is passed through a filter in accordance with the invention.

A circulating pump was used to pump 3 liters of water through a filter housing that held one 10" polypropylene spunbound 5 micron filter. The filter element had been infused with about 17% by weight of the absorbent composition of the invention by the procedure described in Example 1. The pump unit recirculated the water at 10 gpm. A small addition of benzene was made to the 3 liter volume and samples were pulled from the effluent line from the filter unit after 5 minutes to allow the benzene to completely flow through the unit. Cumulative additions were made for 1 to 1400 ppm of combined benzene to generate the loading graph of FIG. 5. All samples were analyzed on the SRI gas chromatograph using a purge and trap system and a photo ionization detector. The measured ppb of the filtrate for the samples is shown in the graph as a function of the ppm benzene concentration present in the input samples. The removal of benzene is seen to be very effective across the entire range of input concentrations.

EXAMPLE 7

Figure 6:
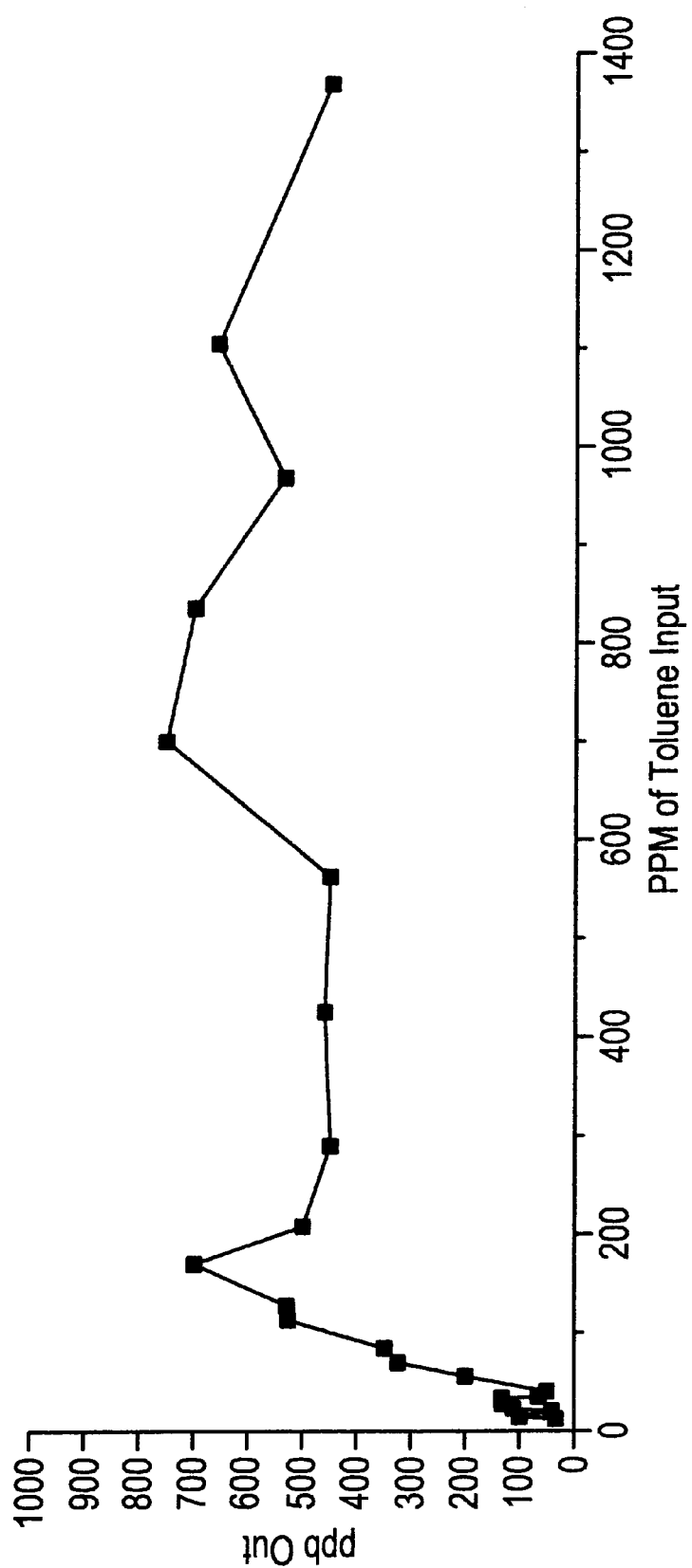
FIG. 6 is a graph illustrating removal of toluene from contaminated water samples, as a function of toluene concentration, when the sample is passed through a filter in accordance with the invention.

The procedure of Example 6 was repeated except that the contaminant for the sample was ethylbenzene. The results are shown in FIG. 6 which illustrates a very high efficacy of the present filtration at all ranges of input concentrations tested.

EXAMPLE 8

Figure 7:
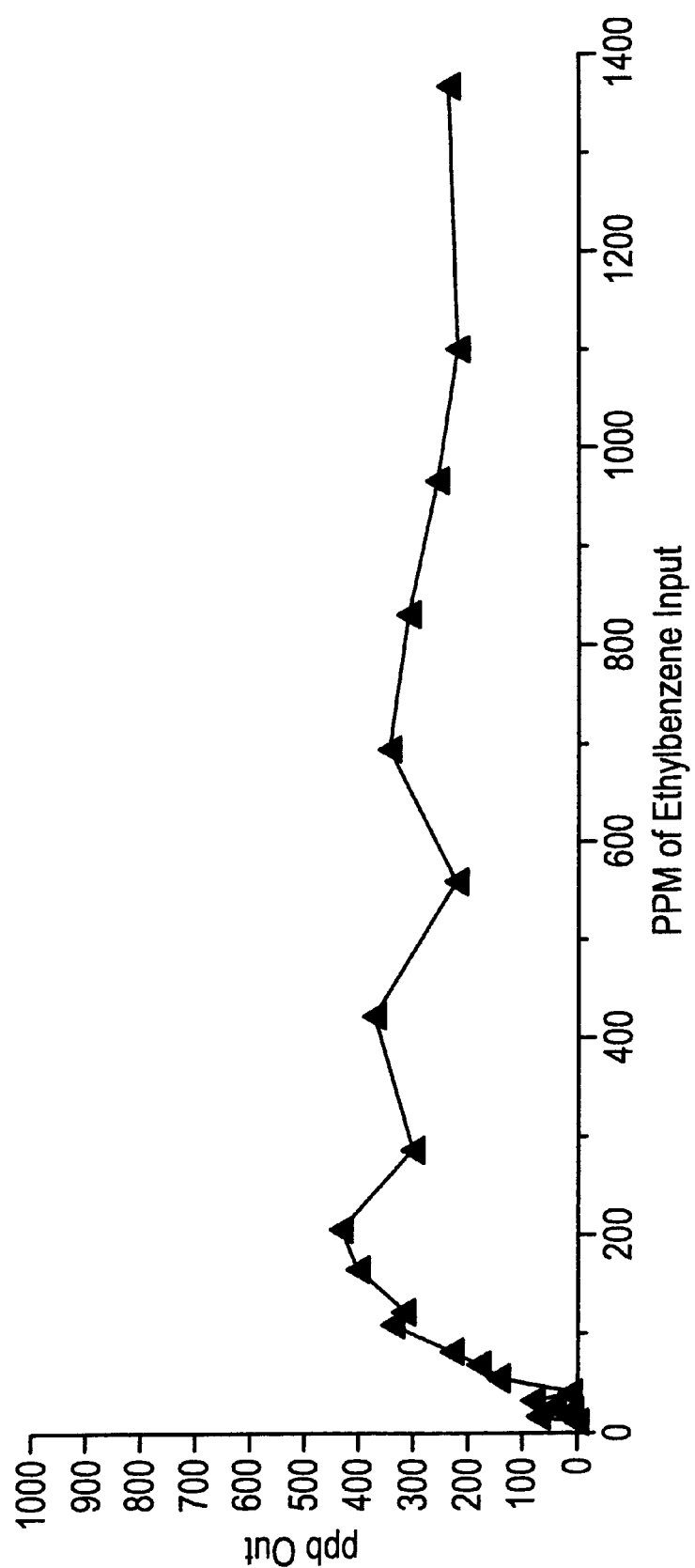
FIG. 7 is a graph illustrating removal of ethylbenzene from contaminated water samples, as a function of ethylbenzene concentration, when the sample is passed through a filter in accordance with the invention.

The procedure of Example 6 was repeated, except that the contaminant for the sample was toluene. The results are shown in FIG. 7, which again illustrates the high efficacy of the present filtration across the range of input concentrations tested.

EXAMPLE 9

An industrial wastewater sample containing a large variety of contaminants was subjected to filtration using devices and methods in accordance with the present invention. The Serfilco cartride unit utilized in the test holds 12 Amtek 10" spunbound polypropylene filters (Ametek, Inc., Sheboygan, Wis. 53082) in a parallel arrangement. Each filter element had been infused with about 17% by weight of the absorbent composition of the invention, by the procedure described in Example 1. A sample was processed in a single pass through the filter assembly. Flow rate through the filter was approximately 30 gpm, with dwell time in the filter assembly being 1 to 2 seconds. The contaminant concentrations for the input and output sample was measured and are shown in Table 3 below. It will be evident that outstanding removal of the organic contaminants has been achieved.

TABLE 3

| Input Wastewater | Purified Filtrate (mg/l) |
|---|---|
| Biochemical Oxygen Demand (5 Day) (405.1), mg/l | 230 |
| Suspended Solids (160.2), mg/l | 120 |
| Oil & Grease (1664), mg/l | 14 |
| Phenol (50) mg/l | 0.078 |

EXAMPLE 10

Oil and grease (O&G) adsorption onto an absorbent infused perlite was evaluated using 1 inch gravity driven columns. Preliminary testing shows an 84% reduction in oil and grease with an influent concentration of 83 mg O&G/L. In the procedure used, a particulate perlite was infused with the absorbent composition of the invention using the procedure of Example 1. This resulted in a perlite media containing 5 to 10% by weight of the absorbent composition.

A test column was prepared from 1 inch PVC pipe that housed a swatch of porous fabric for media support. The column was packed with 21 grams of the treated perlite media to produce a 9.5 inch depth. Two liters of O&G containing water was prepared by adding small droplets of used 30 weight oil to the entire volume. The solution was mixed thoroughly with small doses being poured through the column immediately after each mixing/shaking. (This shaking and dosing technique was also used to collect a representative influent sample.) Two liters were collected from the testing influent and effluent, and preserved with HCl in amber glass bottles. EPA method 1664 was used for analysis.

The samples were analyzed to produce al influent concentration of 83 mg O&G/L and an effluent concentration of 13 mg O&G/L. This is an 84% reduction in O&G. A control non-treated perlite column test produced a 41% reduction of O&G with an influent of 37 mg O&G/L.

While the present invention has been set forth in terms of specific embodiments thereof, the instant disclosure is such that numerous variations upon the invention are now enabled to those skilled in the art, which variations yet reside within the scope of the present teaching. Accordingly, the invention is to be construed by broadly interpreting the scope and spirit of the present disclosure.

What is claimed is:

1. A method for removing organic contaminants from an aqueous phase in which the contaminant is contained, comprising:

passing said aqueous phase through a fluid-pervious filtration media which has been infused with an absorption composition cured in situ at the infused media, said composition comprising a homogeneous thermal reaction product of an oil component selected from the group consisting of glycerides, fatty acids, alkenes, and alkynes, and a methacrylate or acrylate polymer component; said contaminant being thereby immobilized at said media; and collecting the purified filtrate having passed through said filtration media.

2. A method in accordance with claim 1, wherein the contaminant is benzene.

3. A method in accordance with claim 1, wherein the contaminant is toluene.

4. A method in accordance with claim 1, wherein the contaminant is xylene.

5. A method in accordance with claim 1, wherein the contaminant is a halogenated hydrocarbon.

6. A method in accordance with claim 1, wherein the contaminant is an ethoxylated glycol.

7. A method in accordance with claim 1, wherein the said media comprises a nonwoven polypropylene.

8. A method in accordance with claim 1, wherein the said media comprises paper.

9. A method in accordance with claim 1, wherein the said media comprises a porous ceramic.

10. A method in accordance with claim 1, wherein the said media comprises a metal.

11. A method in accordance with claim 1, wherein the said media comprises a mineral particulate.

12. A method in accordance with claim 11, wherein the said mineral is vermiculite.

13. A method in accordance with claim 11, wherein the said mineral is perlite.

14. A filtration apparatus for separating organic contaminants from an aqueous phase in which the contaminant is contained, comprising:

a canister having an inlet and an outlet for passing said liquid phase therethrough;

a fluid-pervious media being provided at the interior of said canister in the flow path of the liquid phase proceeding between said inlet and outlet, said media being infused with a composition cured in situ at the infused media, said composition comprising a homogeneous thermal reaction product of an oil component selected from the group consisting of glycerides, fatty acids, alkenes, and alkynes, with a methacrylate or acrylate polymer component; the said contaminant in the liquid phase flowing through said canister thereby coming into intimate contact with and being immobilized at said media.

15. Apparatus in accordance within claim 14, wherein the said media comprises a nonwoven polypropylene.

16. Apparatus in accordance with claim 14, wherein the said media comprises paper.

17. Apparatus in accordance with claim 14, wherein the said media comprises a porous ceramic.

18. Apparatus in accordance with claim 14, wherein the said media comprises a metal.

19. Apparatus in accordance with claim 14, wherein the said media comprises a mineral particulate.

20. Apparatus in accordance with claim 19, wherein the said mineral is vermiculite.

21. Apparatus in accordance with claim 19, wherein the said mineral is perlite.

\* \* \* \* \*